R. O. BINGHAM.
WAFFLE IRON.
APPLICATION FILED JAN. 18, 1911.
995,520.
Patented June 20, 1911.
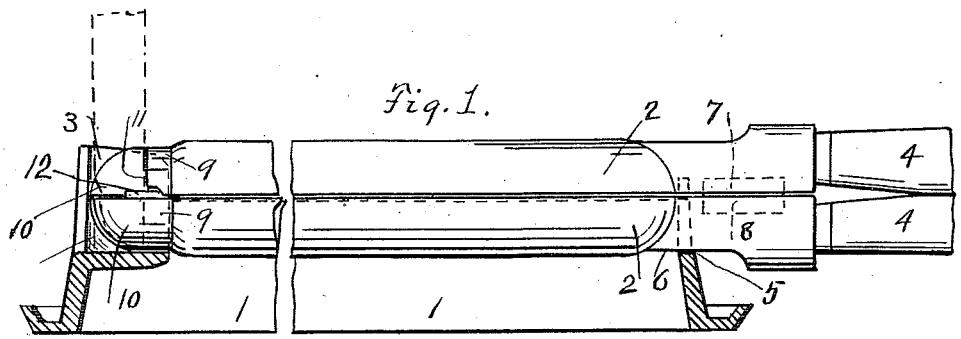
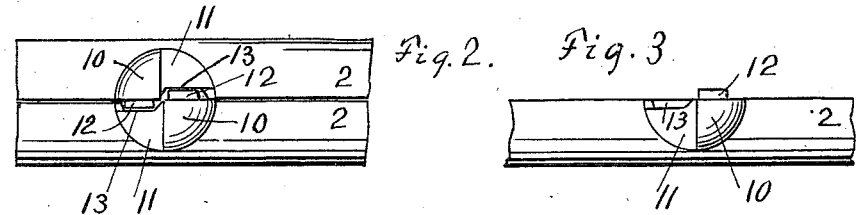
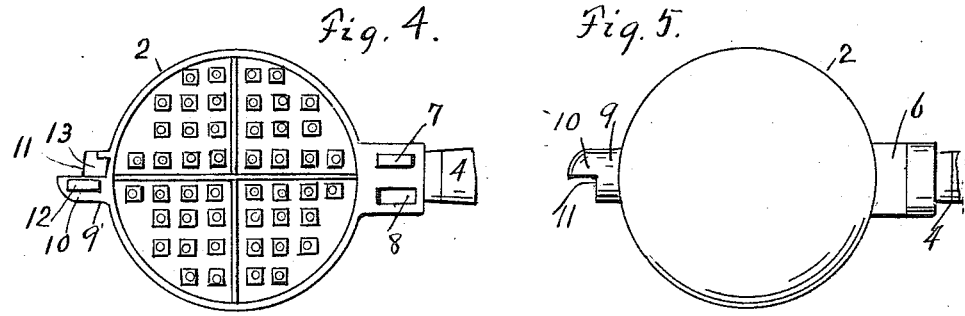
Witnesses
C. W. Catlin
J. W. Livingston
Inventor
Robt. O. Bingham
By Benj. R. Catlin
Attorney

UNITED STATES PATENT OFFICE.

ROBERT O. BINGHAM, OF SIDNEY, OHIO, ASSIGNOR TO THE WAGNER MANUFACTURING CO., OF SIDNEY, OHIO, A CORPORATION OF OHIO.

WAFFLE-IRON.

995,520.        Specification of Letters Patent.    Patented June 20, 1911.

Application filed January 18, 1911. Serial No. 603,300.

*To all whom it may concern:*

Be it known that I, ROBERT O. BINGHAM, a resident of Sidney, in the county of Shelby and State of Ohio, have invented certain new and useful Improvements in Waffle-Irons; and I do hereby declare the following to be a full, clear, and exact description of the invention, such as will enable others skilled in the art to which it pertains to make and use the same.

This invention relates to waffle irons, and the main object is to provide improved journal or pivot extensions for the pans of the device to turn on horizontally and vertically.

The invention consists in the construction hereinafter described, and particularly pointed out in the claims.

In the accompanying drawing which illustrates the invention and forms a part of the specification,—Figure 1 is a side view of the waffle iron, the ring base being in section; Fig. 2 is a partial end view of the two pans assembled but not in the ring base; Fig. 3 is a like view of one pan; Fig. 4 is a plan, and Fig. 5 an inverted or bottom plan, on a smaller scale than the other figures, of one of the pans.

Numeral 1 denotes a ring base or support for the two coöperating pans 2 placed face to face in use. Said base is adapted to stand over any suitable burner or stove-hole, and has in one side a curved socket 3 to receive the journal extensions of the pans which are located diametrically opposite the handles 4. The base also has a flat bottomed notch 5 in which the flat part 6 of the lower handle rests and which is of sufficient width to steady the pans and keep them from turning accidentally, but permitting the pans to be turned horizontally by application of a little force. The two pans 2 are exact duplicates, not rights and lefts as found in many old devices, and are therefore interchangeable, and if one becomes defective a new pan can be ordered by size and style without specifying that a right or a left one is needed. At the handle side of the pans are extensions to which the handles are secured, and each of which on its front face has a lug 7 and a correspondingly shaped socket 8. Diametrically opposite said extensions are journal extensions, the two latter together giving a cylindrical journal with rounded end. Said journal extension of each pan comprises a semi-cylindrical part 9 adjacent to the body of the pan, the part 10 thereof being longer than the part 11. Said parts 10 and 11 of the journal extension are on opposite sides of the longitudinal center of the extension. On the front side or face of one of said parts is a lug 12, and in the front face of said other part is a depression or socket 13. The outer end of part 10 is preferably rounded, and when the pan is in its supporting ring terminates within the socket 3 and coöperates with the concave bottom of the socket when the pan, or when both pans, are turned up to vertical position.

When two pans are placed face to face the lug 7 of one pan enters the socket 8 of the other pan; and lug 12 of one pan enters the socket 13 of the other pan, whereby sidewise movement of one pan on the other when the pans are together carried by the handles is prevented. The right angled space left between the outer end of part 10 and part 11 is designed and adapted to receive the end 10 of the upper pan when the latter is turned up to the position indicated in dotted lines in Fig. 1. In this position the upper part 11 stands on the lower part 10 and supports the weight of the upper pan.

The described journal is strong, has a smooth cylindrical surface of sufficient extent, aids in holding the pans in exact position, and in a simple manner provides for the upward turning of the top pan. The main division between the parts of the journal being horizontal, there is a partial vertical division owing to the shortening of part 11 as compared with part 10.

The use of the described journal is not limited to pans having lugs and sockets 7 and 8 though this construction is preferred. It will be understood that the end of part 11 of the lower pan forms an abutment against which the part 10 of the upper pan will bear to prevent said upper pan from moving more than a trifle beyond the vertical situation indicated in Fig. 1.

Having thus described the invention what I claim is:

1. A waffle iron pan comprising a journal extension with a face substantially in the plane of the top of the pan, the extension being longer at one side of its longitudinal vertical center than at the other side, whereby a space is left to receive the longer portion of the journal extension of a duplicate pan in use, the outer end of said longer part of the extension forming a bearing surface on which the pan may turn up vertically, as set forth.

2. The combination with a support comprising a bearing socket, of duplicate waffle pans placed together face to face one on top of the other, each pan having a journal extension which has a longer part terminating within said socket and a shorter part leaving an open space for the longer part of the top pan to enter when the latter pan is turned up, as set forth.

3. Duplicate waffle pans placed together face to face one on top of the other, each pan having a journal extension a portion of which adjacent the body of its pan is semi-cylindrical, which extension has a longer part and a shorter part on opposite sides of its longitudinal center leaving an open space for the longer part of the top pan to enter when said pan is turned up, said journal extension of each pan having on its front side a projecting lug and a lug-receiving depression.

4. Duplicate waffle pans placed together face to face, each pan having a journal extension a portion of which is semi-cylindrical, which extension has a longer part and a shorter part on opposite sides of its longitudinal center, said extension of each pan having on its front side a lug and a lug-receiving depression, each pan also having an opposite handle-extension with a lug and a lug-receiving depression, as set forth.

5. Two waffle pans face to face and having a journal formed of an extension on each pan in coöperation with the other, said journal being cylindrical for a part of its length and for the rest of its length having two extensions between which are open spaces, the upper pan being freely removable from the lower pan whether the upper pan be down or up.

In testimony whereof, I have signed this specification in the presence of two subscribing witnesses.

ROBERT O. BINGHAM.

Witnesses:
W. H. MAYER,
M. A. PFEFFERLE.

---

Copies of this patent may be obtained for five cents each, by addressing the "Commissioner of Patents, Washington, D. C."